Aug. 23, 1927.
R. W. NORRIS
1,640,008
COMBINED SIGNAL LAMP CASING
Filed July 31, 1925
2 Sheets-Sheet 1
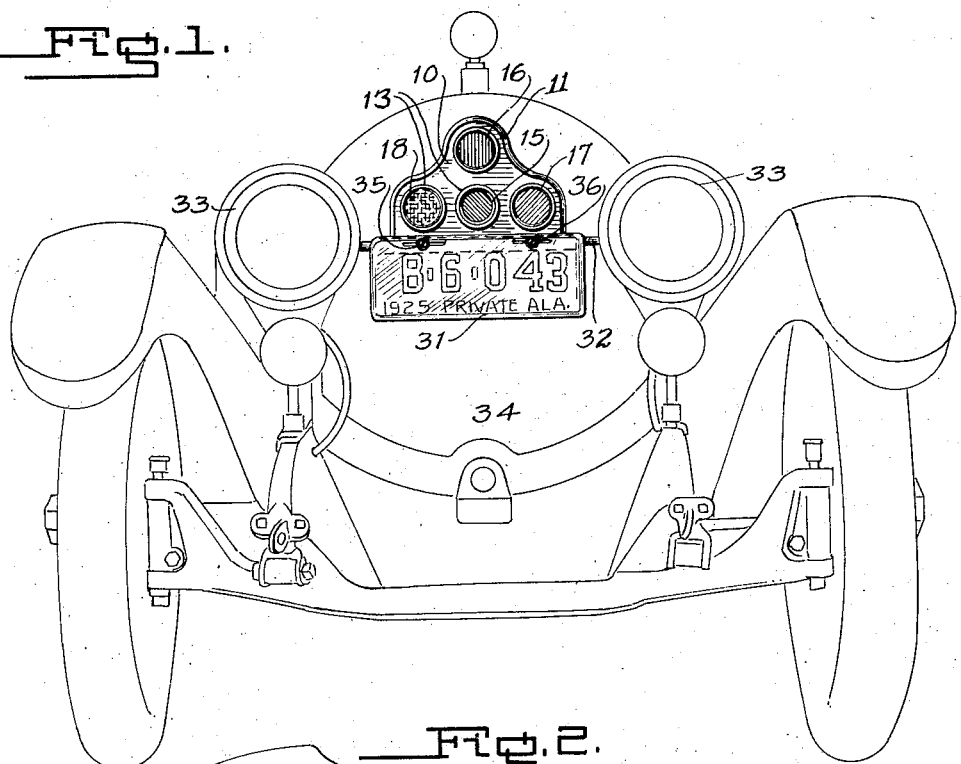
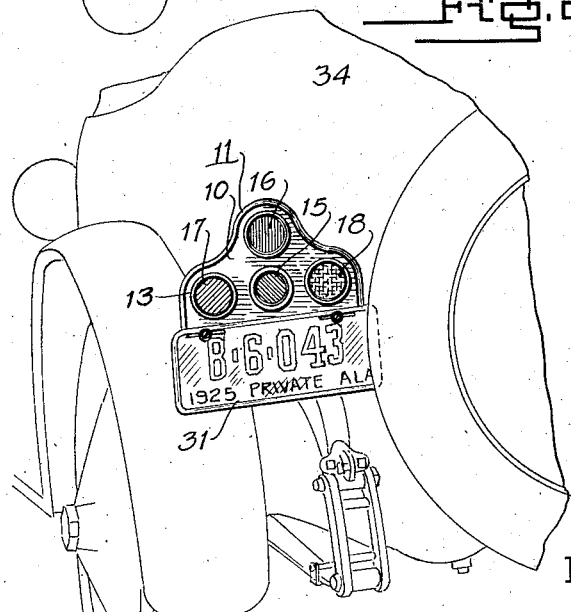
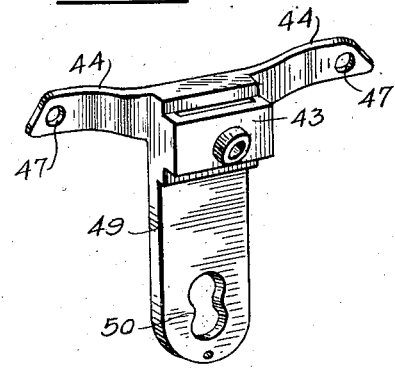
Robert W. Norris
Inventor

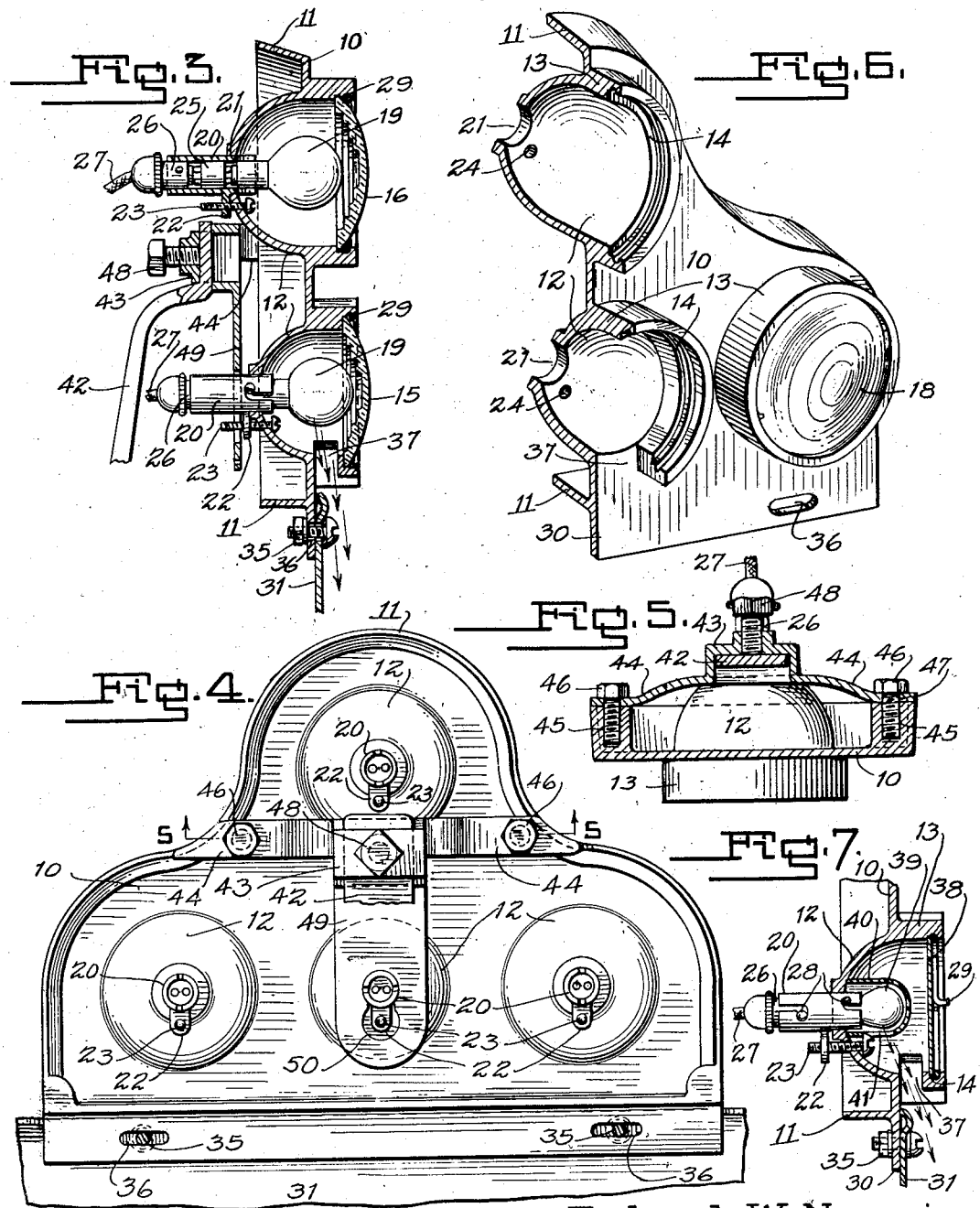

Patented Aug. 23, 1927.

1,640,008

UNITED STATES PATENT OFFICE.

ROBERT W. NORRIS, OF BIRMINGHAM, ALABAMA.

COMBINED SIGNAL-LAMP CASING.

Application filed July 31, 1925. Serial No. 47,347.

The present invention relates to motor vehicle signals, and more particularly to a housing or casing structure embodying a plurality of integrally formed and connected casings for a corresponding number of different colored signal lights.

An object of the present invention is to provide a web or plate for attachment to the front and to the rear, or both, of a motor vehicle and which has in its plate formation a plurality of chambers or housings serving as individual lamps for a number of lights of different colors to be operated either singly or combined to give desired signals of directional movement and of the control of a motor vehicle; to thus provide a solid and rigid structure which may be mounted as a unit upon the ordinary lamp bracket or other support which is employed for the tail lights and the like on motor vehicles of present day construction.

Another object of the invention is to provide a combined structure of this character which is provided with means for supporting a license number plate and which may also be employed for attaching the combined signal casing to the cross brace between the headlights of a motor vehicle, and which means is so arranged upon the combined device that it will maintain a number plate in proper position to be illuminated by one of the lamps.

A still further object of the invention is to provide a combined signal lamp casing with means for converting one of the lamps for use on the front or on the rear of a motor vehicle so that when used on the rear it may show a red, green or other desired normal light and illuminate the number plate, and when used on the front of the vehicle may be obscured from view but which at the same time may be utilized for illuminating the front number plate.

The invention further aims to provide a signal lamp casing of this character which is of general flat plate form so that it will occupy but small space, may be relatively light in weight, and to which may be made separate and independent wire connections for the different lamps to admit easy access to the lamps and connections without disturbing the adjacent lights.

The above and various other objects and advantages of this invention will in part be described in, and in part be understood from the following detailed description of the present preferred embodiment, the same being illustrated in the accompanying drawings, wherein:

Fig. 1 is a front elevation of a combined signal lamp casing constructed according to this invention, and as applied to the front of a motor vehicle and supporting a number plate thereon.

Fig. 2 is a fragmentary perspective view of the rear end of a motor vehicle having the lamp casing of this invention applied thereto.

Fig. 3 is a vertical section taken through the intermediate part of the combined signal lamp casing as mounted on a rear bracket.

Fig. 4 is an enlarged elevation showing the rear side of the lamp casing as attached to the rear bracket, the latter being broken away.

Fig. 5 is a transverse section through the same on the line 5—5 of Fig. 4.

Fig. 6 is a fragmentary sectional view taken through the lamp casing with parts removed.

Fig. 7 is a fragmentary sectional view through the lower central lamp housing with the obscuring attachments applied thereto for use at the front of the vehicle, and Fig. 8 is a detail perspective view of the rear bracket socket used with the casing when mounted on the rear end of the vehicle.

Referring to the drawings the lamp casing comprises a body plate 10 of suitable configuration, and which in the present instance is shown substantially as of triangular shape with the apex portion uppermost, and which is provided with an inwardly extending marginal flange 11 for reinforcing the plate 10 and for providing a means of attachment of the plate to the rear end of a motor vehicle.

The plate 10 is preferably cast with the flange 11 integral therewith and with a plurality of integral housings 12 of cupped shape opening outwardly through the plate 10 and extending partially to opposite sides of the plate to give sufficient depth to the housings 12. The outer end of each housing 12 is provided with a preferably thickened rim 13 which at its inner wall is stepped or shouldered as at 14 to receive a cover glass.

In the present instance the body plate 10 has formed in it three housings 12 arranged in a horizontal row at the lower portion of the plate, and a signal housing 12 at the top portion of the plate immediately over the intermediate lower housing. These housings 12 are provided with cover plates of different colors, namely; the lower central cover plate 15 being of green, the upper housing cover plate 16 being red, one of the lower end cover plates 17 being purple, and the other end cover plate or glass 18 being yellow. These cover plates are transparent and are preferably of a construction to magnify the intensity of the lights 19 which are disposed in the respective housings 12. From Figs. 1 and 2 it will be noted that when the casing is used on the front end of the vehicle the purple cover glass 17 is disposed on the right while the cover glass 17 is disposed on the left when the casing is mounted on the rear end of the vehicle.

In a similar manner, the yellow cover glass 18 is disposed on the left end of the casing when the latter is mounted on the front of the vehicle and is disposed on the right end when the casing is mounted on the rear end of the vehicle. Of course any desired number of housings 12 may be formed in the plate and a corresponding number of differently colored cover glasses may be used, or the cover glasses may be of any other suitable colors to give the desired signals. The arrangement of the cover glasses is in reverse order for the front and rear casings to give the same signals with respect to the same side of the vehicle when either approaching it or when it is moving ahead in the same direction.

Each lamp 19 is mounted in a socket 20 which may be of cylindrical form and which is fitted in a corresponding opening 21 in the back of the housing 12. Each socket 20 has a depending lug 22 adapted to abut against the rear end of the housing 12 and is provided with a threaded aperture for the reception of a retaining screw 23 which is fitted through an opening 24 in the housing 12 beneath and adjacent to the opening 21. As shown in Fig. 3, the screw 23 is introduced through the opening 24 and through the lug 22 from the interior of the housing 12. This construction and arrangement prevails for each housing 12.

As shown, the lamps 19 may be of the two-pole or contact type and each socket 20 is provided with a connector 25 of corresponding type fitted intermediately in the socket to engage the lamp 19 at one side and a removable plug 26 at its other side which constitutes the terminal of an electric cord 27. The lamp 19 and the plug 26 may be mounted in the socket 20 by the usual bayonet slot and pin connections 28, shown in Fig. 7. The cover glasses may be held in the outer ends of the housings 12 by removable spring rings 29 in the usual manner.

The lower edge of the body plate 10 is extended beyond the flange 11 to provide an attaching web 30 which is adapted to overlap a number plate 31 as shown in Fig. 3 and which is adapted to engage over a cross brace 32 which is carried between the lamps 33 of a vehicle 34, as shown in Fig. 1. Bolts 35 are secured through slots 36 formed in the web 30, through the number plate 31 and through the cross bar 32 when the casing is mounted on the forward end of the vehicle. The lower horizontal portion of the flange 11 may seat upon the cross bar or brace 32 to steady the casing and facilitate its mounting on the vehicle.

In order to illuminate the license plate when attached to web 30, the lower side of the intermediate housing 12 is provided with a slot 37 downwardly through which the light rays from the lamp may be projected. The slot 37 is formed in the rim 13 behind the shoulder 14 and in front of the plate 10. When the casing is used on the front of the vehicle 34 the lower intermediate light may be obscured as shown in Fig. 7 by fitting an opaque cover plate 38 therein in lieu of the glass 15, and by substituting a smaller lamp 39 in lieu of the lamp 19. When this is done, a metallic hood 40 is fitted over the lamp 39 and may be held in place by the head of the screw 23 engaging in a slot 41 formed in the lower side of the hood. This slot 41 also admits light rays from the lamps 39 downwardly through the slot 37 in the housing 12.

In order to secure the lamp casing to the rear bracket arm 42 of the vehicle, a socket 43 is employed which has at opposite sides a pair of arms 44 arranged to extend across the rear side of the plate 10, and the flange 11 at opposite sides is provided with threaded enlargements 45 to receive screws 46 which pass through openings 47 in the opposite ends of the arms 44. The socket 43 is provided with a set screw 48 adapted to be clamped against the bracket 42 when the socket is fitted thereover. The socket may be provided with a depending arm 49 adapted to brace the casing and which is adapted to bear against the rear end of the lowermost central housing 12. The lower end of the arm 49 is provided with an elongated slot 50 of substantially key-hole shape to fit the adjacent lamp socket 20 and to clear the rear end of the adjacent screw 23. The marginal edge of the slot 50 is adapted to hold the socket 20 and thus serve as a brace or support for the lower end of the casing.

The signal casings may be used in pairs, one upon each end of the vehicle so as to face forwardly and rearwardly thereof, or they may be used singly upon the vehicle according to the desired system of signals adopted. When used together the respective lamps 19 of the front and rear casings may be connected to any suitable system of electric circuits to operate the lamps either singly or in pairs in each casing and to thus give the same signals at both the front and rear of the vehicles. By use of the attachments shown in Fig. 7 the intermediate lower lamp may be used only for illuminating the front license plate when the casing is mounted on the front end of the vehicle 34. The casing is of similar construction whether used on the front or the back of the vehicle and is so constructed that it will accommodate the rear socket 43, or may be secured directly to the front cross brace 32 or the like convenient for such use.

It is of course understood that various changes and modifications may be made in the details of construction and design of the above specifically described embodiment of this invention without departing from the spirit thereof, and restricted only by the scope of the following claims.

What is claimed is:

1. A combined signal lamp casing comprising a plate having a depending web for supporting a number plate, a plurality of lamp housings mounted in said plate, one of said housings having a slot in its lower side for illuminating the number plate, and a detachable hood for said slotted housing, said hood having a slot in its side adapted to register with the slot in said housing.

2. A combined signal lamp casing comprising a body plate having a lamp housing and a depending web for supporting a number plate, a detachable hood for said housing, said hood and housing each having a slot in its under side registering one with the other for the passage of light rays for illuminating a number plate on said web.

ROBERT W. NORRIS.